Figures 1, 3:
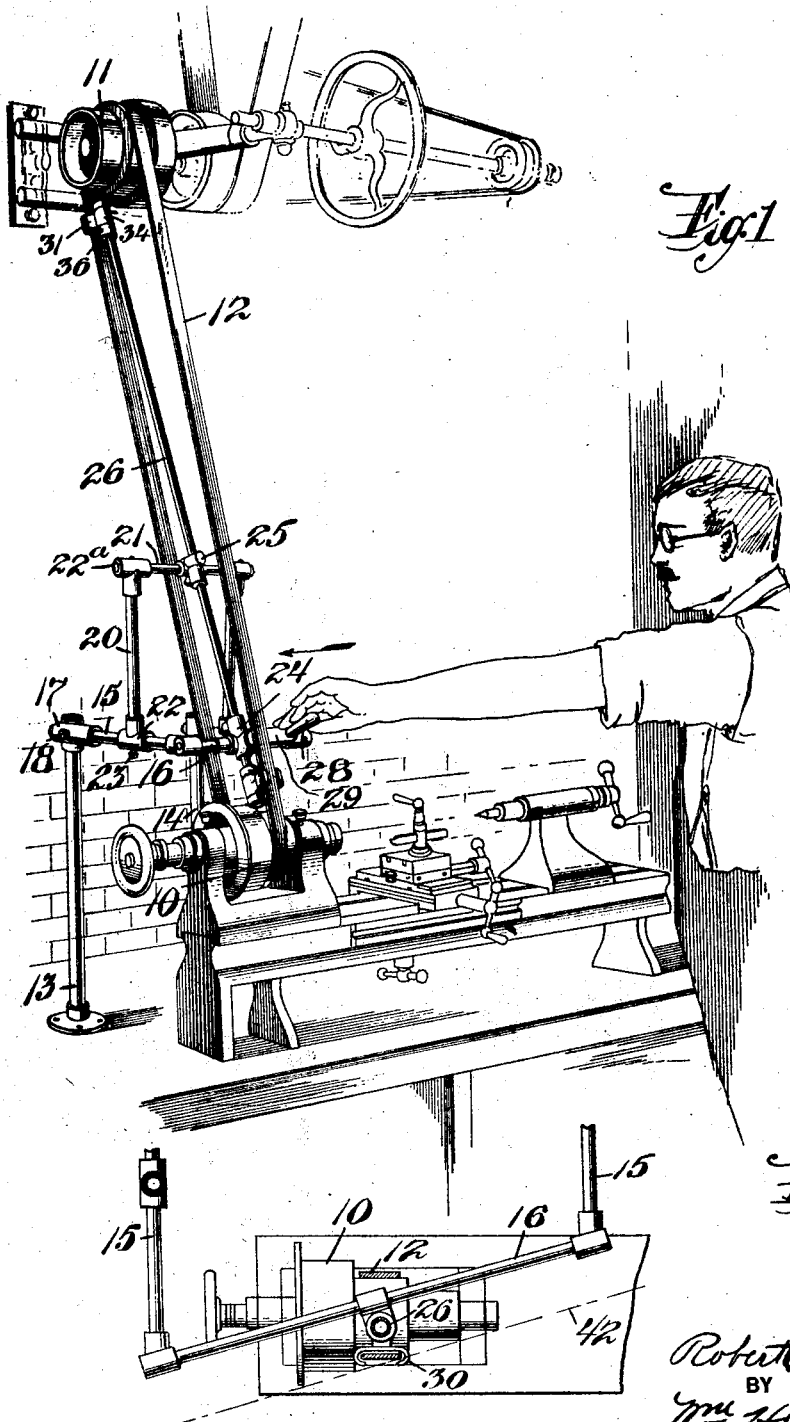

Dec. 8, 1925.  
R. E. RICHTER  
BELT SHIFTER  
Filed April 7, 1924  
1,564,447  
3 Sheets-Sheet 1

INVENTOR  
Robert Richter,  
BY  
Wm H. Caufield.  
ATTORNEY

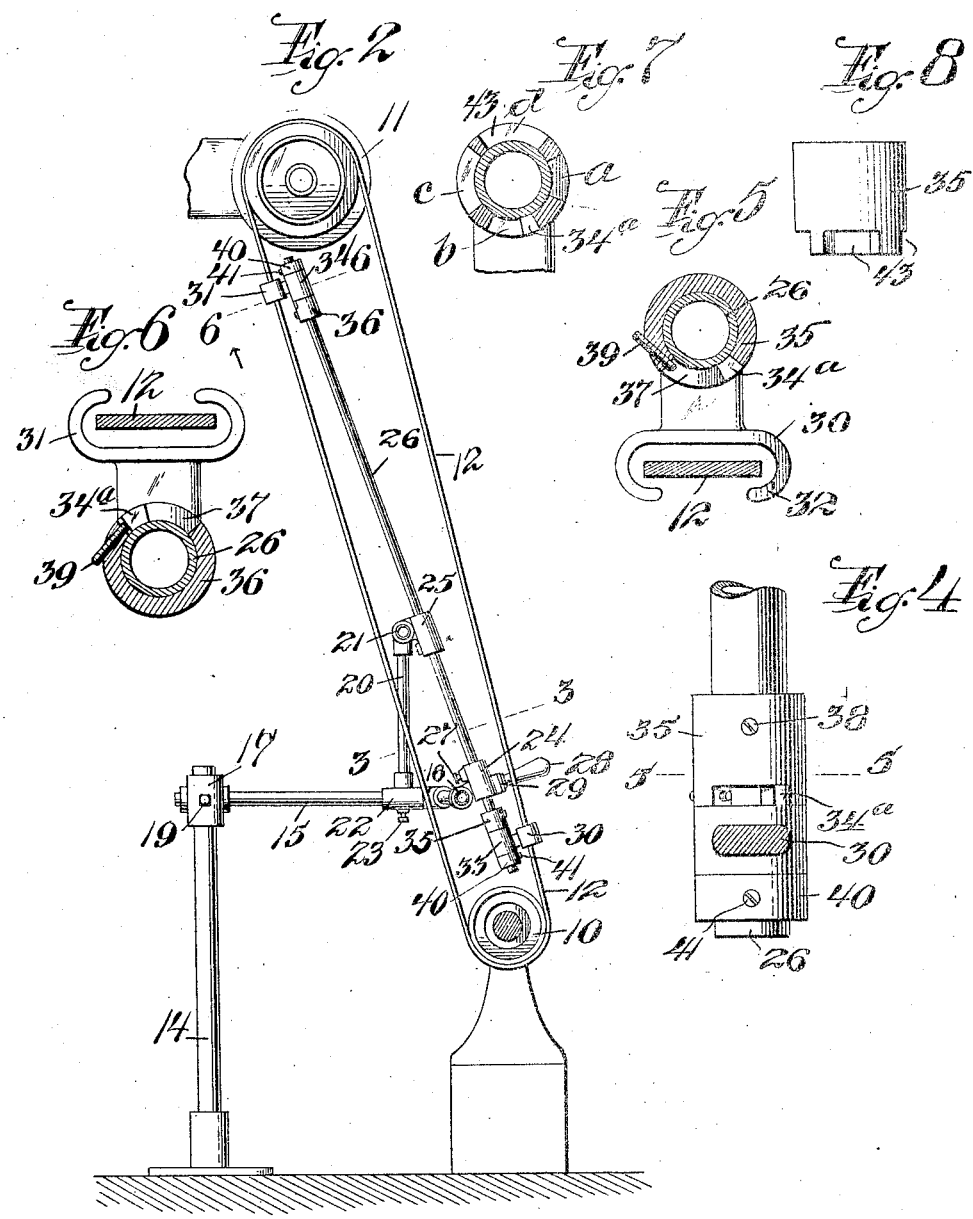

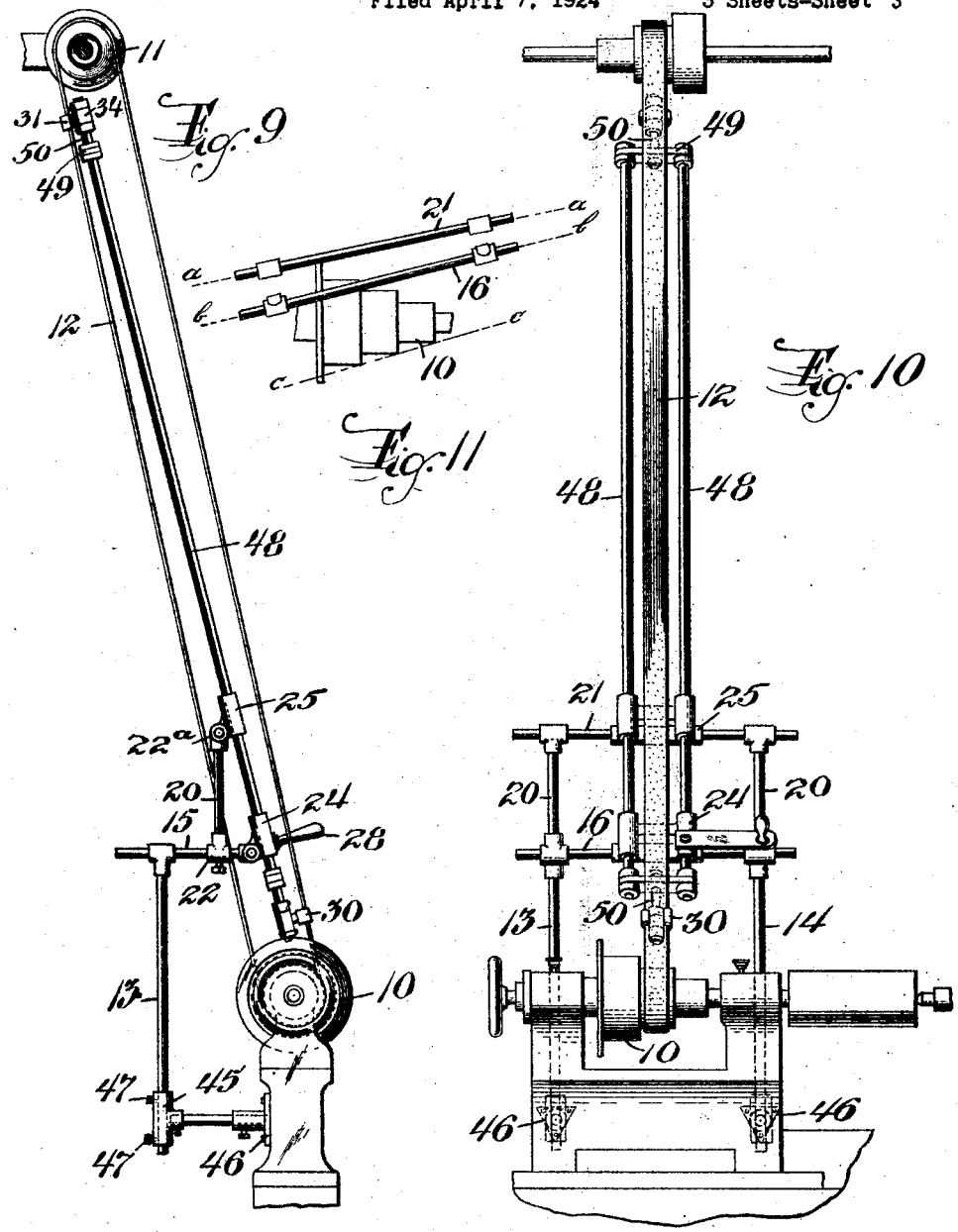

Patented Dec. 8, 1925.

1,564,447

UNITED STATES PATENT OFFICE.

ROBERT E. RICHTER, OF NEWARK, NEW JERSEY.

BELT SHIFTER.

Application filed April 7, 1924. Serial No. 704,594.

*To all whom it may concern:*

Be it known that I, ROBERT E. RICHTER, a citizen of the United States, and a resident of Newark, county of Essex, and State of New Jersey, have invented certain new and useful Improvements in Belt Shifters, of which the following is a specification.

This invention relates to an improved belt shifter to be used on cone pulleys and is adapted to shift the belt easily and is thus safe to use as no extreme pressure need be applied in changing the belt from one size pulley to the other. The operator is not brought into direct contact with the belt except by a firm slidable shifter equipped with a handle for its easy operation.

The invention illustrated in the accompanying drawings in which Figure 1 is a perspective view of the belt shifter in use. Figure 2 is a section with the carriage of the shifter in elevation. Figure 3 is a section on line 3—3 in Figure 2. Figure 4 is a detail of a belt engaging part with the carriage and Figure 5 is a section on line 5—5 in Figure 4. Figure 6 is a section on line 6—6 in Figure 2 and Figures 7 and 8 are views showing a modification of connection between the carriage and one of the belt-engaging devices. Figure 9 is a side view of a modified form of construction. Figure 10 is a front view of the construction shown in Figure 9. Figure 11 is a view partly diagrammatic to show the relative positions of the horizontal arms of the frame.

In Figures 1 to 8 I show the belt shifter as used on a small lathe which has the cone pulley 10 driven from the cone pulley 11 by the belt 12. When shifting a belt running over a cone pulley the first shift is on the cone pulley where the belt passes to the smaller pulley and then on the other cone pulley to step the belt up on the larger pulley.

That is done in this case by a carriage carrying belt-engaging devices and the carriage is mounted on a suitable bench, floor or wall support or on the machine itself. The support is illustrated as mounted on the bench in Figures 1 to 2 and comprises posts 13 and 14 and on this is mounted a horizontal U-shaped frame, usually formed of pipe and having the side arms 15 and the cross arm 16. The brackets 17 provide for both horizontal and vertical adjustment holding the side arms 15 in adjusted position by the screws 18 and holding the whole frame on the posts by the screws 19.

On the horizontal frame is secured a vertical U-shaped frame with the vertical arms 20 and the cross arm 21. This frame is adjustable on the side arms 15 by means of the couplings 22 which are held in adjusted position by the screws 23.

The cross arms 16 and 21 form the holders for the carriage which consists of slides 24 and 25 which slide freely on the cross arms, and the rod 26 which is supported by the slides 24 and 25 and is held against movement by the set screw 27 in the slide 24 but has a free movement in the slide 25 as it must necessarily twist or rotate slightly in the slide 25 when the shifter is operated due to the difference in the cone pulley angle. On the carriage, preferably on the lower slide 24, is a handle 28 on the end of a bar 29 long enough to keep the hand of the operator away from the belt.

On each end of the carriage are the belt-engaging devices 30 and 31, these being usually open loops formed by flat fingers 32 spaced apart to permit their being placed on the belt. The devices 30 and 31 are secured to the collars 33 and 34 respectively.

Adjacent to the collars 33 and 34 are the stop collars 35 and 36, respectively. Each stop collar has a recess 37 and the collars 33 and 34 have lugs 34ª to enter these recesses to limit the swinging movement of collars relative to the rod 26, as the stop collars are secured to the rod by screws 38.

The distance of swinging movement can be adjusted by the adjusting screws 39 which are arranged tangentially in the stop collars and form the abutment at one end of the slot 37.

Suitable retaining collars 40 are fastened to the rod 26 to hold the collars 33 and 34 in engagement with the stop collars, being held in position on the rod by the screws 41.

When the device is set up it is arranged and adjusted so that the rod 26 slides laterally between the reaches of the belt and the lower slide 24 slides parallel to a line shown at 42 in Figure 3 which is substantially parallel with the pitch of the cone pulley and a better showing of this is in Figure 11 in which the lower cross arm 16 is on the line b—b substantially parallel with the angle of the cone pulleys indicated by line c—c but I find that in operation the upper cross arm 21 must be arranged at an angle converging toward the line $b$—$b$ and indicated by the line $a$—$a$ particularly if there is a difference in the angle of the other cone pulley, that is, the upper cone pulley. In other words, the slides 24 and 25 do not work exactly parallel this being possible because the rod 26 slides freely and rotates freely in the slide 25.

Assuming the belt to be running and in position, the belt shifting loops or devices 31 and 30 ride free of the belt. Assuming from the illustration in Figure 1 that the lathe on the bench is to be run faster, the handle 28 would be shifted to the right, this would carry the rod 26 with it and the collar 33 that carries the loop 30 cannot move in a rotative direction as its lug 34$^a$ is at its limit of movement in one direction, that is, it cannot swing to the left looking at the device from the front. It thus carries the belt over the smaller cone pulley, the rod 26 moving with it but the upper device 31 and its collar 34 can swing to the left which retards the strain on the belt at this point the belt being momentarily slackened at this point due to its being dropped on the smaller pulley below, but does exercise enough influence on the belt to cant it and it immediately rides over the edge of the next succeeding larger pulley on the cone pulley 11. The belt shifter operates the same whether the cone pulleys are run at a high or slow speed.

In the movement to the left, the reverse takes place since the upper device 31 carries the belt with it on the initial movement of the rod 26 and the lower device swings to the right for the proper limited distance and the belt being momentarily slacked at this point due to its being dropped on a smaller pulley up above, it is easily canted on to the next succeeding larger pulley of the cone pulley 10.

Instead of the adjusting screws 39, various adjustments can be provided by the construction shown in Figures 7 to 8. In this form the stop collar such as 35, would have a series of recesses 43, these recesses being of various lengths such as the one at $a$ which is the narrowest, the one at $b$ being longer, that at $c$ being still longer, and that at $d$ being the longest. By placing either one of these recesses over the lug 34$^a$ of the corresponding collar, various arcs of movement can be provided for the belt shifting device relative to the rod.

In Figures 9 and 10 I illustrate a modified form in which the upright posts 13 and 14 are fastened directly to the machine itself, being slidable in the parts 45 supported from the brackets 46 and held in various adjusted positions by the screws 47. As to the belt shifter itself, I mount on the lower slide 24 and the upper slide 25, separated sleeves which receive the double rods 48 in lieu of the single rod 26. End plates 49 at the top and bottom of the carriage support the rods 20 onto which the belt-engaging devices are secured similar to that described for securing them to the ends of the rods 26.

In a larger and heavier construction as herein shown, the upper slide 25 is aided in its free movement by the upper horizontal bar 21 as shown in Figure 11 being placed parallel with the upper cone angle the difference between the cone angles being thus compensated for by this disposition of the upper cross arm 21. The carriage can thus slide freely on two rods not parallel since the upper slide is without restraining means and the rods 48 can slide freely therein and can also revolve freely therein.

With this form of frame the adjustment is easy and the installation is simple because the T-joint 22 on each end of the upright frame is a right angle to the T joint 22$^a$ at the top of the frame on each side, and this arrangement prevents tilting in any direction, either sidewise, forwardly or backwardly. When first erected the frame is equipped with the rod 26 and when the rod 26 and its carriages are slid the frame so adjusts itself that the rod 21 assumes the proper angle. When this is accomplished the set screws 23 are tightened to keep the parts in place and to prevent too much play or rattling but are not absolutely essential to the assembly of the frame.

Minor changes can be made in the form and arrangement of the parts without departing from the scope of the invention.

I claim:

A belt shifter comprising a stand formed of posts, a horizontal U-shaped frame secured to the posts and adjustable vertically and horizontally thereon, a vertical U-shaped frame secured to the horizontal frame, slides on the cross arms of the U-shaped frames, a rod secured in the slides, a collar on each end of the arm and having a limited rotation on the rod, and a belt engaging loop on each collar.

In testimony that I claim the foregoing, I have hereto set my hand, this 13th day of March, 1924.

ROBERT E. RICHTER.